(12) United States Patent
Wei

(10) Patent No.: US 11,697,748 B2
(45) Date of Patent: Jul. 11, 2023

(54) DUST-PURIFYING ADHESIVE LAYER, DUST-PURIFYING FILM, AND DUST-PURIFYING FILM SLEEVE

(71) Applicant: SHENZHEN LANHE TECHNOLOGIES CO., LTD., Shenzhen (CN)

(72) Inventor: Wei Wei, Shenzhen (CN)

(73) Assignee: SHENZHEN LANHE TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/725,821

(22) Filed: Apr. 21, 2022

(65) Prior Publication Data
US 2023/0133830 A1    May 4, 2023

(30) Foreign Application Priority Data

Nov. 4, 2021 (CN) .......................... 202111301151.7
Nov. 4, 2021 (CN) .......................... 202122685457.9

(51) Int. Cl.
*C09J 7/29* (2018.01)
*G02B 1/18* (2015.01)

(52) U.S. Cl.
CPC ............... *C09J 7/29* (2018.01); *G02B 1/18* (2015.01); *C09J 2203/326* (2013.01); *C09J 2301/16* (2020.08); *C09J 2483/006* (2013.01)

(58) Field of Classification Search
CPC ......................................................... C09J 7/29
See application file for complete search history.

(56) References Cited

U.S. PATENT DOCUMENTS

2009/0186181 A1* 7/2009 Mase .................. B29C 63/02
156/60
2017/0184766 A1* 6/2017 Ozawa ................... C08F 2/50

FOREIGN PATENT DOCUMENTS

CN 204454980 U * 7/2015

OTHER PUBLICATIONS

CN 204454980U Machine Translation (Year: 2015).*
Brookfield DVPlus Viscometer Brochure, Brookfield Engineering, https://www.brookfieldengineering.com/-/media/ametekbrookfield/brochures/bro-dvplus-rev-a.pdf?la=en&revision=b0e9132a-c8bf-4ae0-89ec-d76a58037061&hash=B3BF7FB958FCF609766D4BAB8A286DD0, accessed Nov. 15, 2022 (Year: 2022).*

* cited by examiner

*Primary Examiner* — Zachary M Davis
(74) *Attorney, Agent, or Firm* — ScienBiziP, P.C.

(57) ABSTRACT

The present disclosure provides a dust-purifying adhesive layer, a dust-purifying film, and a dust-purifying film sleeve. The dust-purifying adhesive layer comprises a substrate layer, an optically clear adhesive (OCA) layer, and a dust-purifying layer, the dust-purifying layer and the OCA layer respectively disposed on two sides of the substrate layer, wherein the dust-purifying layer is adapted for dust-purifying and air bubbles elimination. Compared with the prior art, the dust-purifying adhesive layer comprises a dust-purifying layer having functions of dust-purifying function and anti-foaming and when the dust-purifying film is arranged on the screen of the electronic device, the dust-purifying layer is in direct contact with the screen, and during the film-pasting process, air bubbles can be quickly eliminated, so that no air bubbles are generated during the film-pasting process.

9 Claims, 22 Drawing Sheets

DUST-PURIFYING ADHESIVE LAYER, DUST-PURIFYING FILM, AND DUST-PURIFYING FILM SLEEVE

RELATED APPLICATIONS

This application claims the benefit of priority to Chinese Patent Application Number 202111301151.7 filed on Nov. 4, 2021 and Chinese Patent Application Number 202122685457.9 filed on Nov. 4, 2021, in the China National Intellectual Property Administration. The entire contents of the above-identified application are hereby incorporated by reference.

TECHNICAL FIELD

The disclosure relates to the technical field of dust-purifying films, and in particular to a dust-purifying adhesive layer, a dust-purifying film having the functions of dust-purifying and anti-foaming, and a dust-purifying film sleeve.

BACKGROUND

With the continuous development and progress of the society, smart phones, tablet computers, etc. have been widely used. However, the screens of these products are usually exposed to exterior environment, and can be easily damaged when the device is hit with a strong impact. To prevent such damages to the devices, consumers usually adhere a protective film on the screen to protect the screen.

The existing protective film can be generally divided into soft film and toughened film, wherein the toughened film is mainly made of tempered glass. And the tempered glass is fitted to the touch screen, and when the device is dropped or scratched, the tempered film may protect the touch screen due to its hardness and prevent damage thereto.

However, before the commercial toughened film fits on the touch screen, the stains on the touch screen need to be erased, leaving a little dust, oil or fingerprints and other foreign matters which can easily produce air bubbles, thereby requires more time to wipe the touch screen before the protective film can be fitted onto the touch screen, which may cause frustration of the consumers.

SUMMARY

The present disclosure has been made in view of the above problems, and provides a dust-purifying adhesive layer and a method for manufacturing the dust-purifying adhesive layer, a dust-purifying film having the functions of dust-purifying and anti-foaming, a method for manufacturing the dust-purifying film, a film-attaching method for attaching the dust-purifying film and a dust-purifying film sleeve.

In order to solve the above problem, the present disclosure provides a dust-purifying adhesive layer comprising: a substrate layer, an optically clear adhesive (OCA) layer, and a dust-purifying layer, the dust-purifying layer and the OCA layer respectively disposed on two sides of the substrate layer, wherein the dust-purifying layer is adapted for dust-purifying and air bubbles elimination.

In some embodiments, the dust-purifying layer has fluidity, and a Brookfield viscosity of the dust-purifying layer ranges from 400 cps to 500 cps.

In some embodiments, the dust-purifying layer is configured to be arranged on a screen of an electronic device, and the dust-purifying layer wrapping foreign matters on the screen of the electronic device to remove dust and air bubbles on the screen.

In some embodiments, a material of the dust-purifying layer comprises the following components mixed by weight ratio: 28%-35% methyl vinyl silicone rubber, 55%-65% ethyl formate, 8%-12% xylene and 1.5%-2.5% ethylbenzene.

In some embodiments, the substrate layer has a thickness ranging from 48 um to 52 um, the OCA layer has a thickness ranging from 37 um to 43 um, and the dust-purifying layer has a thickness ranging from 37 um to 43 um.

In order to solve the above problem, the present disclosure a dust-purifying film, wherein the dust-purifying film comprises a protective layer and a dust-purifying adhesive layer according to the above dust-purifying adhesive layer, and the protective layer is attached to the OCA layer.

In some embodiments, the protective layer is a glass layer, and a thickness of the protective layer ranges from 0.05 mm to 0.85 mm.

In some embodiments, the dust-purifying film further comprises a release layer, and the release layer is arranged on a surface of the dust-purifying layer facing away from the substrate layer, and a thickness of the release layer ranges from 48 um to 52 um.

In order to solve the above problem, the present disclosure a method of manufacturing a dust-purifying adhesive layer, the method comprising: providing a softened substrate layer, coating silicone material on a first surface of the substrate layer and curing the silicon material in an oven to form a dust-purifying layer on the first surface of the substrate layer, compounding a first release layer on a surface of the dust-purifying layer, coating optically clear adhesive on a second surface of the substrate layer and performing ultraviolet curing to form an OCA layer on the second surface of the substrate layer, and compounding a second release layer on a surface of the OCA layer to obtain the dust-purifying adhesive layer, wherein the dust-purifying layer is adapted for dust-purifying and air bubbles eliminating.

In some embodiments, in the step of coating the silicone material on the first surface of the substrate layer, and curing the silicon material in the oven, the temperature of a channel of the oven is controlled to range from 150° C. to 180° C.

In some embodiments, in the step of coating the silicone material on the first surface of the substrate layer, and curing in the oven, a time period of curing the dust-purifying adhesive layer in the oven is controlled to be 2 minutes to 3 minutes.

In order to solve the above problem, the present disclosure a method for manufacturing a dust-purifying film, comprising the following steps: providing a substrate layer, coating silicone material on a first surface of the substrate layer and curing the silicon material in an oven to form a dust-purifying layer on the first surface of the substrate layer, compounding a release layer on a surface of the dust-purifying layer, coating an optically clear adhesive on a second surface of the substrate layer and performing ultraviolet curing to form an OCA layer on the second surface of the substrate layer, and attaching a protective layer on the surface of the OCA layer.

In some embodiments, in the step of coating the silicone material on the first surface of the substrate layer, and curing the silicon material in the oven, the temperature of a channel of the oven is controlled to range from 150° C. to 180° C.

In some embodiments, in the step of coating the silicone material on the first surface of the substrate layer, and curing the silicon material in the oven, a time period of curing the dust-purifying adhesive layer in the oven is controlled be 2 minutes to 3 minutes.

In order to solve the above problem, the present disclosure a film-attaching method for attaching a dust-purifying film, comprising: tearing off a release layer on a surface of the dust-purifying layer, aligning a surface of the dust-purifying pasted with the dust-purifying layer to a screen of an electronic device, placing the dust-purifying film on the screen of the electronic device, and pressing the dust-purifying film to exhaust gas and adhere to the screen of the electronic device.

In some embodiments, after pressing the dust-purifying film to exhaust gas and adhere to the screen of the electronic device, the film-attaching method further comprises: if foreign matters exist between the dust-purifying film and the screen of the electronic device, separating the dust-purifying film from the screen of the electronic device, removing the foreign matters, and repositioning the dust-purifying film on the screen of the electronic device.

In some embodiments, the step of removing the foreign matters comprises: if the foreign matters are on the screen of the electronic device, removing the foreign matters by wiping or pasting the foreign matters, and if the foreign matters are on the dust-purifying layer of the dust-purifying film, removing the foreign matters by a dust-purifying film repair paper.

In order to solve the above problem, a dust-purifying film sleeve, comprising: the above dust-purifying film, and a dust-purifying film repair paper, wherein the dust-purifying film repair paper comprises a body and a repair layer arranged on a surface of the body, and the repair layer is configured to be arranged on the dust-purifying layer of the dust-purifying film to repair the dust-purifying layer.

In some embodiments, a viscosity of the repair layer is greater than a viscosity of the dust-purifying layer.

In some embodiments, the repair layer is further configured to be arranged on the dust-purifying layer of the dust-purifying film to replace foreign matters on the dust-purifying layer.

In some embodiments, a material of the dust-purifying layer comprises the following components mixed by weight ratio: 28%-35% methyl vinyl silicone rubber, 55%-65% ethyl formate, 8%-12% xylene and 1.5%-2.5% ethylbenzene.

Compared with the prior art, the dust-purifying adhesive layer comprises a dust-purifying layer, the dust-purifying layer is adapted for dust-purifying and air bubbles elimination, and when the dust-purifying film is arranged on the screen of the electronic device, the dust-purifying layer is in direct contact with the screen, and during the film-pasting process, air bubbles can be quickly eliminated, so that no air bubbles are generated during the film-pasting process.

BRIEF DESCRIPTION OF DRAWINGS

Implementations of the present disclosure will now be described, by way of embodiment, with reference to the attached figures.

DETAILED DESCRIPTION

Figure 1:
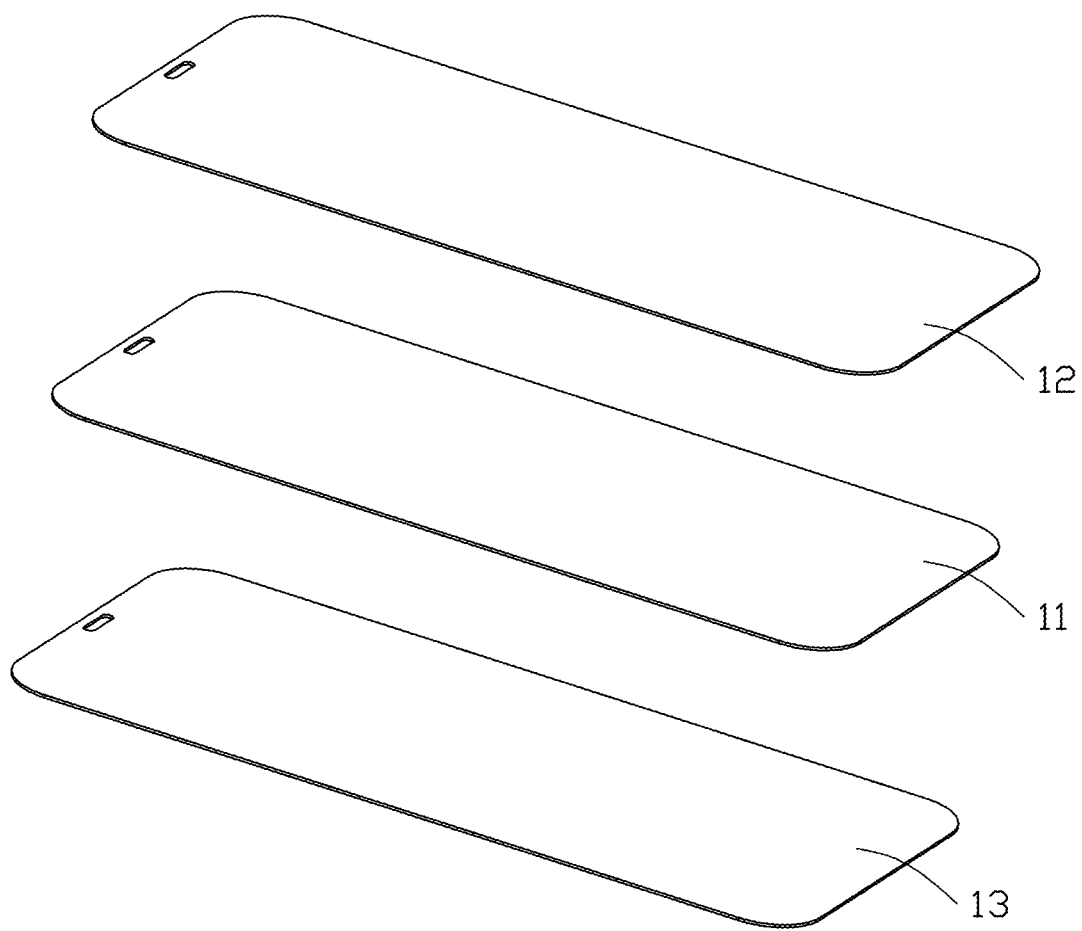
FIG. 1 is an exploded view of a dust-purifying adhesive layer of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to", specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references may mean "at least one".

Referring to FIG. 1, the present disclosure provides a dust-purifying adhesive layer 10, which can be applied to a dust-purifying film, and the dust-purifying film can be, but is not limited to, a soft film or a toughened film.

The dust-purifying adhesive layer 10 comprises a substrate layer 11, an optically clear adhesive (OCA) layer 12 and a dust-purifying layer 13, and the OCA layer 12 and the dust-purifying layer 13 are respectively disposed on two sides of the substrate layer 11. The dust-purifying layer 13 is adapted for dust-purifying and air bubbles elimination, and when the dust-purifying film is arranged on a screen of an electronic device, the dust-purifying layer 13 is configured to be arranged on the screen of the electronic device and directly contacts the screen, so that the dust-purifying layer 13 can quickly purify the dust and eliminate the air bubbles during the film-pasting process, thereby no air bubbles are generated during the film-pasting process.

Specifically, the dust-purifying layer 13 implements the functions of dust-purifying and anti-foaming by wrapping foreign matters on the screen of the electronic device.

In the present embodiment, the dust-purifying layer 13 has fluidity, so that in a case where foreign matters such as dust, oil and fingerprinting exist on the screen of the electronic device during the film-pasting process, the dust-purifying layer 13 wraps foreign matters, so that no air bubbles are generated during the film-pasting process, so as to realize the functions of dust-purifying and anti-foaming.

The dust-purifying layer 13 has a Brookfield viscosity in the range of 400 cps to 500 cps, wherein cps is a viscosity unit, and is commonly used for fluid viscosity.

In the present embodiment, the dust-purifying layer 13 may be a silica gel layer. Further, a material of the dust-purifying layer 13 comprises the following components mixed by weight ratio: 28%-35% methyl vinyl silicone rubber, 55%-65% ethyl formate, 8%-12% xylene and 1.5%-2.5% ethylbenzene. Of course, the dust-purifying layer 13 may also be made of other materials, which are not limited herein.

The air bubbles generated during the film-pasting process are mainly because foreign matters such as dust, oil, and fingerprint exist on the screen of the electronic device. The contact between foreign matters and the dust-purifying film leads to an uneven surface of the dust-purifying film, so that a slit or a gap is formed between the screen and the dust-purifying film. This results in the generation of the air bubbles.

In the present embodiment, the dust-purifying layer 13 has certain fluidity. When the dust-purifying film is configured to be arranged on the screen of the electronic device, if there are foreign matters such as oil, dust, fingerprinting on the screen, by the fluidity of the dust-purifying layer 13 rapidly wraps foreign matters such as dust, oil and fingerprints, and fills the slit or the gap formed between the foreign matters and the dust-purifying film. This can eliminate the air bubbles caused by foreign matters, thereby implementing the functions of dust-purifying and anti-foaming, so that the image quality of the electronic device is clearer.

In the present embodiment, a material of the substrate layer 11 is polyethylene terephthalate (PET). Of course, in other embodiments, the substrate layer 11 may also be another material, which is not limited herein.

In the present embodiment, the substrate layer 11 is subjected to a softening process so as to have certain flexibility.

Further, the flexibility of the substrate layer 11 is greater than the flexibility of the dust-purifying layer 13. Of course, in other embodiments, the substrate layer 11 may also have a fluidity corresponding to the dust-purifying layer 13.

When the dust-purifying layer 13 wraps foreign matters such as oil, dust, and fingerprint, the substrate layer 11 corresponding to the wrapping position will be slightly bulging. In this case, since the substrate layer 11 has certain flexibility, the substrate layer 11 at the position corresponding to the bulging position in the dust-purifying layer 13 can remain flat, thereby effectively ensuring the flatness of the entire dust-purifying film.

Further, the OCA layer 12 may be made of optically clear adhesive (OCA). Of course, in other embodiments, the OCA layer 12 may also be replaced by a layer made of other materials, which is not limited herein.

In the present embodiment, the thickness of the substrate layer 11 ranges from 48 um to 52 um, the thickness of the OCA layer 12 ranges from 37 um to 43 um, and the thickness of the dust-purifying layer 13 ranges from 37 um to 43 um.

Compared with the prior art, the dust-purifying adhesive layer 10 provided by the present disclosure comprises a dust-purifying layer 13 having functions of dust-purifying function and anti-foaming, and when the dust-purifying film is arranged on the screen of the electronic device, the dust-purifying layer 13 is in direct contact with the screen, and during the film-pasting process, air bubbles can be quickly eliminated, so that no air bubbles are generated during the film-pasting process.

Figure 2:
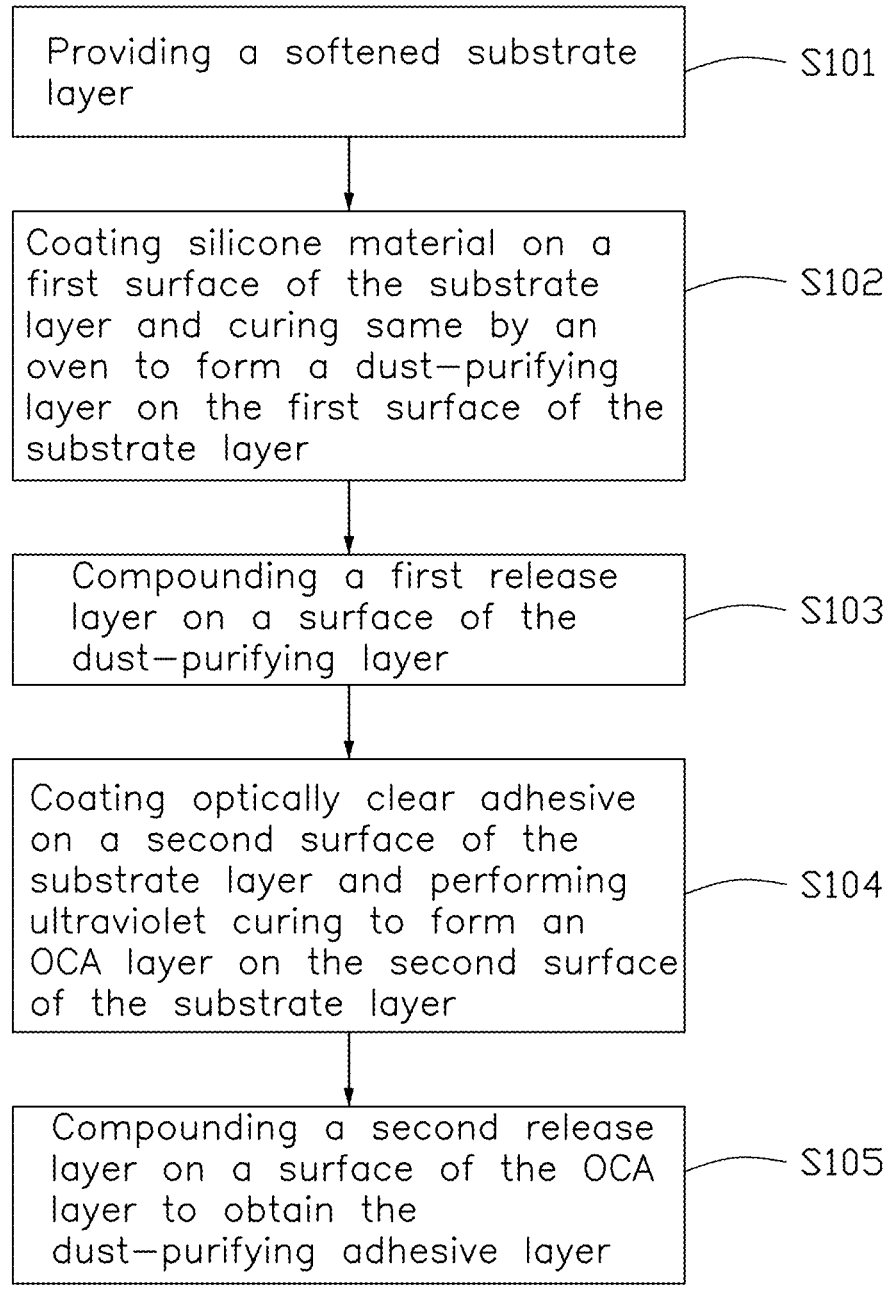
FIG. 2 is a schematic flowchart of a method for manufacturing the dust-purifying adhesive layer shown in FIG. 1.

Referring to FIG. 2, the present disclosure further provides a method of manufacturing the above dust-purifying adhesive layer 10, the method comprising the following steps.

Step S101, providing a softened substrate layer,

Step S102, coating silicone material on a first surface of the substrate layer, and curing the silicon material in an oven to form a dust-purifying layer on the first surface of the substrate layer, step S103, compounding a first release layer on the surface of the dust-purifying layer, Step S104: coating optically clear adhesive (OCA) on a second surface of the substrate layer and performing ultraviolet curing to form an optically clear adhesive (OCA) layer on the second surface of the substrate layer, and Step S105, compounding a second release layer on a surface of the OCA layer to obtain a dust-purifying adhesive layer.

Further, in the step of coating the silicone material on the first surface of the substrate layer, and curing the silicon material in the oven, the temperature of a channel of the oven is controlled to range from 150° C. to 180° C.

Further, in the step of coating the silicone material on the first surface of the substrate layer, and curing the silicon material in the oven, the time for curing the dust-purifying adhesive layer in the oven is controlled to be 2 minutes to 3 minutes.

Compared with the prior art, the dust-purifying adhesive layer obtained by the manufacturing method provided by the present disclosure comprises the dust-purifying layer having functions of dust-purifying function and anti-foaming, and when the dust-purifying film is arranged on the screen of the electronic device, the dust-purifying layer is in direct contact with the screen, and during the film-pasting process, air bubbles can be quickly eliminated, so that no air bubbles are generated during the film-pasting process.

Figure 3:
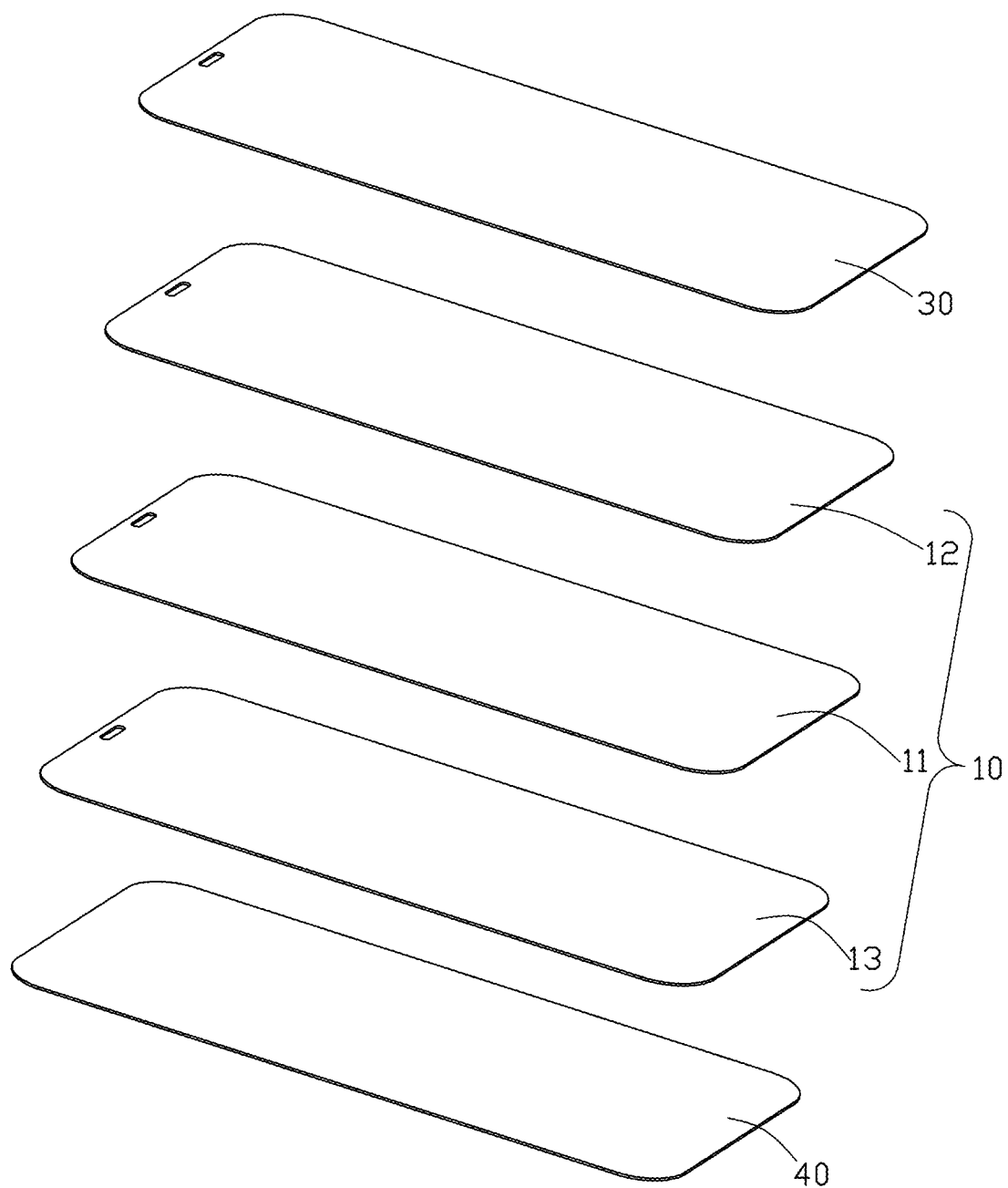
FIG. 3 is an exploded view of a dust-purifying film of the present disclosure.

Referring to FIG. 3, the present disclosure further provides a dust-purifying film 100. The dust-purifying film 100 may be, but is not limited to, a soft film and a toughened film. In the present embodiment, the dust-purifying film 100 is taken as the toughened film as an example for description. The dust-purifying film 100 has functions of dust-purifying function and anti-foaming.

The dust-purifying film 100 comprises a protective layer 30 and the dust-purifying adhesive layer 10, and the protective layer 30 is arranged on the OCA layer 12 of the dust-purifying adhesive layer 10. The structure of the dust-purifying adhesive layer 10 is the same as that of the dust-purifying adhesive layer 10 described above, and will not be described herein again.

In the present embodiment, the protective layer 30 is a glass layer, and the thickness of the protective layer 30 ranges from 0.05 mm to 0.85 mm.

Further, the dust-purifying film 100 further comprises a first release layer 40, which is arranged on a surface of the dust-purifying layer 13 facing away from the substrate layer 11, and the thickness of the first release layer 40 ranges from 48 um to 52 um.

By adhering the first release layer 40 on the surface of the dust-purifying layer 13 away from the substrate layer 11, the dust-purifying layer 13 of the dust-purifying layer 10 can be protected, and the dust-purifying layer 13 can be arranged on the screen of the electronic device by tearing off the first release layer 40 before adhering the dust-purifying film.

Compared with the prior art, the dust-purifying film 100 provided by the present disclosure has the dust-purifying adhesive layer 10 described above, and the dust-purifying adhesive layer 10 comprises a dust-purifying layer 13 having functions of dust-purifying and anti-foaming, and when the dust-purifying film 10 is arranged on the screen of the electronic device, the dust-purifying layer 13 is arranged on the screen of the electronic device and directly contacts the screen, so that the dust-purifying layer 13 can quickly dust-purify and anti-foam during the film-pasting process, so that no air bubbles are generated during the film-pasting process.

Figure 4:
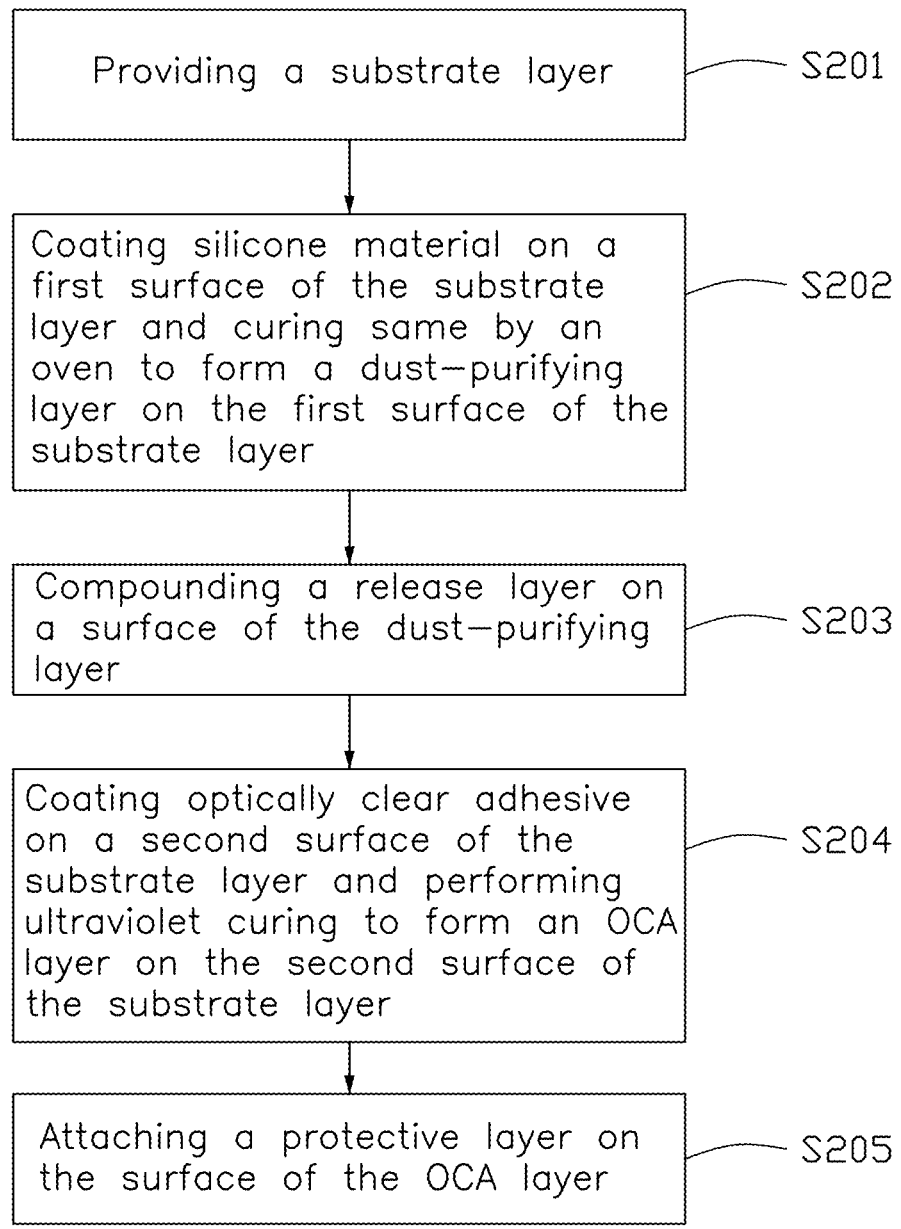
FIG. 4 is a schematic flowchart of a method for manufacturing the dust-purifying film shown in FIG. 3.

Referring to FIG. 4, the present disclosure further provides a method of manufacturing a dust-purifying film having dust-purifying and anti-foaming function, the method comprising the following steps:

Step S201: providing a substrate layer,

Step S202, coating silicone material on a first surface of the substrate layer, and curing the silicon material in an oven to form a dust-purifying layer on the first surface of the substrate layer, Step S203, compounding a release layer on a surface of the dust-purifying layer, Step S204, coating optically clear adhesive (OCA) on a second surface of the substrate layer and performing ultraviolet curing to form an OCA layer on the second surface of the substrate layer, Step S205, attaching a protective layer on the surface of the OCA layer.

Further, in the step of coating the silicone material on the first surface of the substrate layer, and curing the silicon material in the oven, the temperature of a channel of the oven is controlled to range from 150° C. to 180° C.

Further, in the step of coating the silicone material on the first surface of the substrate layer, and curing by the oven, the time for curing the dust-purifying adhesive layer in the oven is controlled to be 2 minutes to 3 minutes.

Compared with the prior art, the dust-purifying film obtained by the manufacturing method provided by the present disclosure comprises the dust-purifying adhesive layer described above, and the dust-purifying adhesive layer comprises the dust-purifying layer having functions of dust-purifying and anti-foaming. When the dust-purifying film is arranged on the screen of the electronic device, the dust-purifying layer is in direct contact with the screen, and during the film-pasting process, dust-purify and anti-foam can be quickly performed, so that no air bubbles are generated during the film-pasting process.

Figure 5:
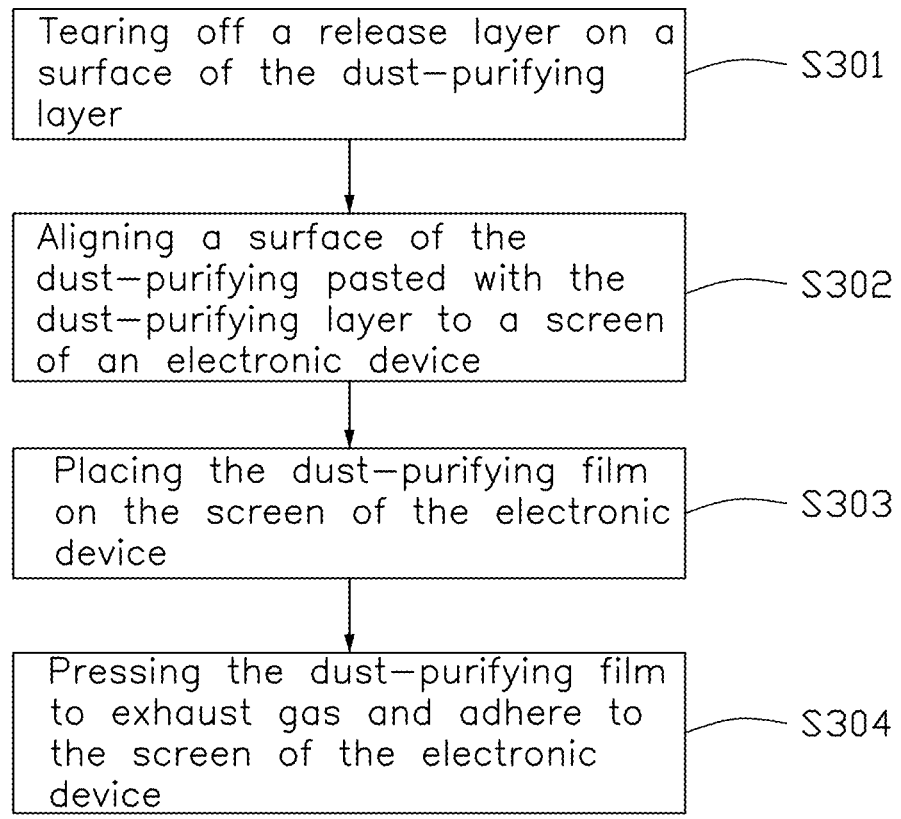
FIG. 5 is a schematic flowchart of a method for attaching the dust-purifying film of the present disclosure.

Referring to FIG. 5, the present disclosure further provides a film-pasting method for attaching the dust-purifying film 100, the film-pasting method comprising the following steps.

Step S301, tearing off the first release layer 40 on the surface of the dust-purifying layer 13, Step S302, aligning the surface of the dust-purifying film 100 pasted with the dust-purifying layer 13 to the screen of the electronic device, Step S303, placing the dust-purifying film 100 on the screen of the electronic device, and Step S304, pressing the dust-purifying film 100 to exhaust gas and adhere to the screen of the electronic device.

Figure 6:
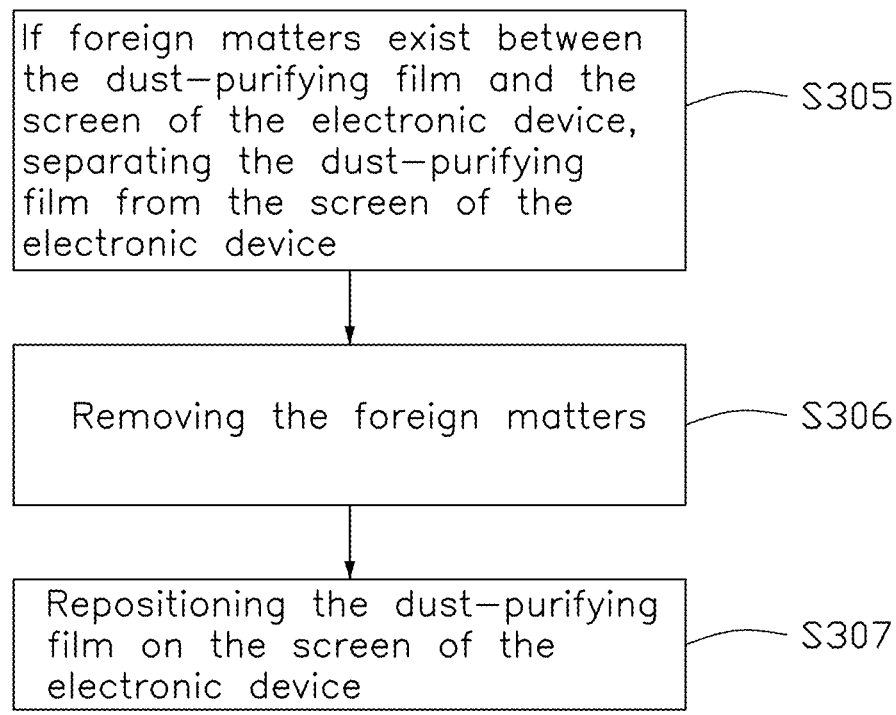
FIG. 6 is a schematic flowchart of another embodiment of a method for attaching the dust-purifying film of the present disclosure.

In an embodiment, referring to FIG. 6, after pressing the dust-purifying film 100 to exhaust gas and adhere to the screen of the electronic device, the film-attaching method further comprises the following steps.

Step S305: if foreign matters exist between the dust-purifying film 100 and the screen of the electronic device after film-attaching, separating the dust-purifying film 100 from the screen of the electronic device, Step S306: removing the foreign matters, and Step S307: repositioning the dust-purifying film 100 on the screen of the electronic device.

The step of removing the foreign matters comprises the following steps.

If the foreign matters are on the screen of the electronic device, removing the foreign matters by wiping or pasting the foreign matters, and If the foreign matters are on the dust-purifying layer 13 of the dust-purifying film 100, removing the foreign matters by a dust-purifying film repair paper.

Compared with the prior art, in the film method provided in the present embodiment, since the dust-purifying film 100 used has functions of dust-purifying function and anti-foaming, during the film-pasting process, air bubbles can be quickly eliminated, so that no air bubbles are generated during the film-pasting process. In addition, in the case where foreign matters remains on the screen of the electronic device, the dust-purifying film 100 can quickly wrap the foreign matters, so as to avoid the occurrence of air bubbles, thereby achieving an excellent function of anti-foaming.

Meanwhile, if a large volume of foreign matters remains on the screen of the electronic device, the dust-purifying film 100 may be separated from the screen of the electronic device, and then the foreign matters is cleaned, and the dust-purifying film 100 is adhered on the screen of the electronic device again. The dust-purifying film 100 provided in this embodiment not only has functions of dust-purifying and anti-foaming, but also the special fluidity of the dust-purifying layer enables it to be repeatedly adhered and used compared with the existing protective film. In the process of separating the dust-purifying film 100 from the electronic device screen, even if the surface of the dust-purifying layer is stained with foreign matters such as dust, it will not affect the re-bonding of the dust-purifying film 100 with the electronic device screen.

Figure 7:
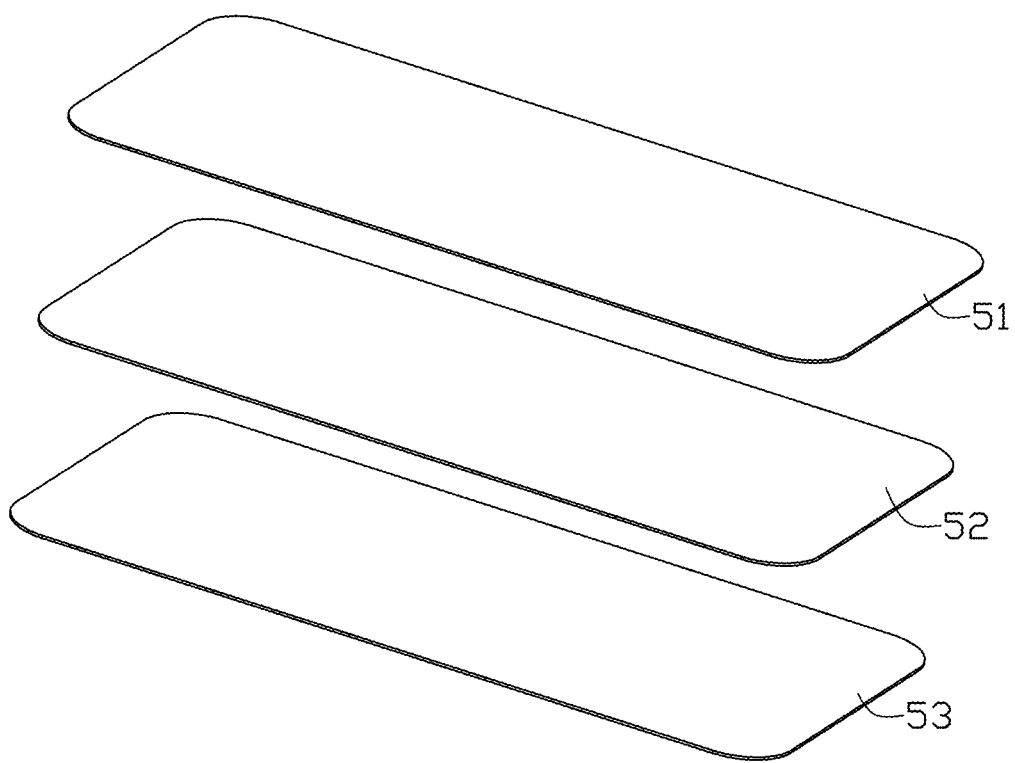
FIG. 7 is an exploded view of a dust-purifying film sleeve according to an embodiment of the present disclosure.

The present disclosure further provides a dust-purifying film sleeve 200. Referring to FIG. 7, the dust-purifying film sleeve 200 comprises a dust-purifying film repair paper 50 and the dust-purifying film 100. The dust-purifying film repair paper 50 comprises a body 51 and a repair layer 52 arranged on the surface of the body 51. The repair layer 52 is configured to attaching the dust-purifying layer 13 of the dust-purifying film 100 to repair the dust-purifying layer 13.

Further, a viscosity of the repair layer 52 is greater than a viscosity of the dust-purifying layer 13.

In the case where the viscosity of the repair layer 52 is greater than the viscosity of the dust-purifying layer 13, the repair layer 52 is further configured to adhere to the dust-purifying layer so as to displace foreign matters arranged on the dust-purifying layer 13, thereby repairing the dust-purifying layer 13 and effectively extending the service life of the dust-purifying film 100.

In the present embodiment, a material of the dust-purifying layer 13 comprises the following components mixed by weight ratio: 28%-35% methyl vinyl silicone rubber, 55%-65% ethyl formate, 8%-12% xylene and 1.5%-2.5% ethylbenzene.

The key for enhancing the adsorption capacity of the silica gel is to increase its active unit structure. By using the patented MA-Enhance™-adsorption enhancement technology, a strong pressure can be generated at the time of contact between the repair layer 52 and the dust-purifying film 100. Strong and weak gel phase absorption produces a chemical activation reaction, which quickly activates the silicone molecular activity of the dust-purifying film 100, making its molecule active unit structure more active, thus enhancing its adsorption, and making the automatic adsorption effect of the dust-purifying film 100 better.

Further, the dust-purifying film repair paper 50 further comprises a second release layer 53, and the second release layer 53 is arranged on the repair layer 52.

By setting the second release layer 53 on the repair layer 52, the second release layer 53 can be protected, and when repairing the dust-purifying layer 13, it is only necessary to tear off the second release layer 53 on the repair layer 52.

Figure 8:
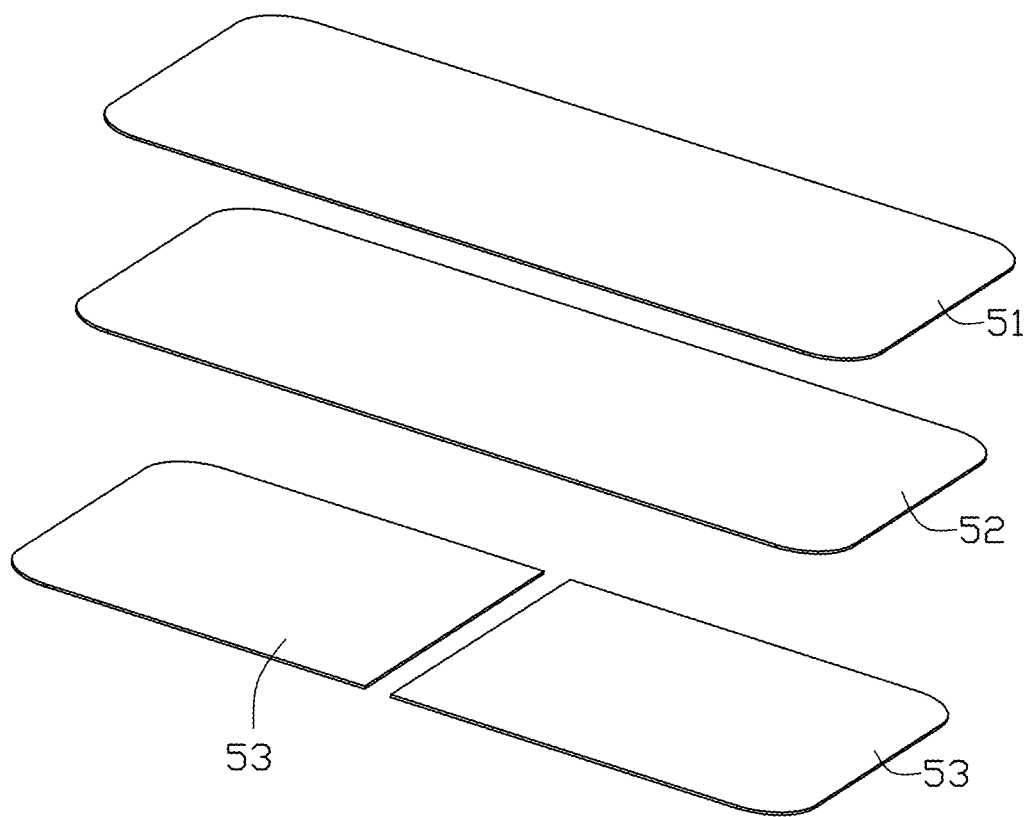
FIG. 8 is an exploded view of the dust-purifying film sleeve according to another embodiment of the present disclosure.
Figure 9:
FIG. 9 is a photograph of a screen of an electronic device before attaching the film.
Figure 10:
FIG. 10 is a photograph of the screen of the electronic device before attaching the film.
Figure 11:
FIG. 11 is a photograph of the screen of the electronic device before attaching the film.
Figure 12:
FIG. 12 is a photograph of the screen of the electronic device before attaching the film.
Figure 13:
FIG. 13 is a photograph of the screen of the electronic device before attaching the film.
Figure 14:
FIG. 14 is a photograph of the screen of the electronic device before attaching the film.

Of course, referring to FIG. 8, in other embodiments, the dust-purifying film repair paper 50 comprises a plurality of second release layers 53 arranged on the repair layer 52.

By setting a plurality of second release layers 53 on the dust-purifying film repair paper 50, the user can selectively tear off the required amount of second release layers 53 according to the demand.

Of course, in other embodiments, the user can also temporarily adhere the dust-purifying film 100 to the repair layer 52 without using the dust-purifying film 100, and adhere the dust-purifying film 100 to the screen of the electronic device again when it needs to be used.

Compared with the prior art, the dust-purifying adhesive layer 10 of the dust-purifying film sleeve 200 provided by the present embodiment comprises the dust-purifying layer 13 having functions of adjust-purifying and anti-foaming. When the dust-purifying film 100 is arranged on the screen of the electronic device, the dust-purifying layer 13 is in direct contact with the screen of the electronic device, and during the film-pasting process, air bubbles can be quickly eliminated, so that no air bubbles are generated during the film-pasting process. The dust-purifying adhesive layer 10 is made of a silica gel material, and silica gel is a high-elasticity porous structure polymer, and after staining such as dust and oil is adhered, the surface tension thereof is increased, thereby affecting the leveling effect thereof. In the present disclosure, the repair layer 52 can repair the dust-purifying layer 13, and quickly replace the dust, oil and other stains on the dust-purifying film 100 through the viscosity difference between the repair layer 52 and the dust-purifying layer 13, repair the dents and sliding marks in the dust-purifying adhesive layer 10, reduce the surface tension of the dust-purifying adhesive layer 10, realize rapid traceless leveling, so that the repaired dust-purifying adhesive 10 has strong wrapping again. If it is attached to the electronic device again, no air bubbles will be generated, so that the dust-purifying film 100 can be recycled and has a longer service life.

The repair process includes the following two manners. Firstly, since the viscosity of the repair layer 52 is greater than the viscosity of the dust-purifying layer 13, when the repair layer 52 is arranged on the surface of the dust-purifying layer 13, the repair layer 52 can displace foreign matters such as dust on the surface of the dust-purifying layer 13, making the surface of the dust-purifying layer 13 cleaner. Second, since foreign matters are adhered on the surface of the dust-purifying layer 13 will lead to the uneven surface of the dust-purifying layer. By pasting the repair layer 52 on the dust-purifying layer 13, its fluidity and the fluidity of the dust-purifying layer 13 will repair the uneven surface of the dust-purifying layer 13. In this way, the dust-purifying film 100 can be reused to improve its utilization rate.

Hereinafter, the film-attaching effect of the dust-purifying film 100 of the present disclosure will be described.

Figure 15:
FIG. 15 is an effect diagram of the dust-purifying film of the present disclosure arranged on the screen of the electronic device.
Figure 16:
FIG. 16 is an effect diagram of the dust-purifying film of the present disclosure arranged on the screen of the electronic device.
Figure 17:
FIG. 17 is an effect diagram of the dust-purifying film of the present disclosure arranged on the screen of the electronic device.
Figure 18:
FIG. 18 is an effect diagram of a conventional protective film arranged on the screen of the electronic device.
Figure 19:
FIG. 19 is an effect diagram of the conventional protective film arranged on the screen of the electronic device.
Figure 20:
FIG. 20 is an effect diagram of the conventional protective film arranged on the screen of the electronic device.
Figure 21:
FIG. 21 is an effect diagram of the conventional dust-purifying film arranged on the screen of the electronic device.
Figure 22:
FIG. 22 is an effect diagram of the conventional dust-purifying film arranged on the screen of the electronic device.

FIGS. 9 to 14 are photographs of the screen of the electronic device before attaching the film, FIGS. 15 to 17 are the dust-purifying film 100 of the present disclosure arranged on the screen of the electronic device. FIGS. 18 to 22 are the effect diagrams of the conventional protective film arranged on the screen of the electronic device.

As can be seen from FIGS. 9 to 14, there is dust on the screen of the electronic device before attaching the film, and many air bubbles are generated after the existing protective film is arranged on the screen of the electronic device, while no air bubbles are generated after the dust-purifying film 100 of the present disclosure is arranged on the screen of the electronic device. It can be seen from the comparison that the dust-purifying film 100 of the present disclosure has excellent dust-purifying and anti-foaming functions.

What disclosed above are only the preferred embodiments of the present application, which of course cannot be used for limiting the present application. Therefore, equivalent changes made in accordance with the present application still fall within the scope of the present application.

What is claimed is:
1. A dust-purifying adhesive layer comprising:
a substrate layer,
an optically clear adhesive (OCA) layer, and
a dust-purifying layer, the dust-purifying layer and the OCA layer respectively disposed on two sides of the substrate layer, wherein the dust-purifying layer is adapted for dust-purifying and air bubbles elimination and has fluidity, and
when the dust-purifying layer is arranged on a screen with foreign matters of an electronic device, the dust-purifying layer wraps the foreign matters on the screen and fills gaps formed between the foreign matters and the dust-purifying layer,
wherein a material of the dust-purifying layer comprises the following components mixed by weight ratio: 28%-

35% methyl vinyl silicone rubber, 55%-65% ethyl formate, 8%-12% xylene and 1.5%-2.5% ethylbenzene.

2. The dust-purifying adhesive layer according to claim 1, wherein a Brookfield viscosity of a composition which formed the dust-purifying layer ranges from 400 cP to 500 cP.

3. The dust-purifying adhesive layer according to claim 1, wherein the substrate layer has a thickness ranging from 48 um to 52 um, the OCA layer has a thickness ranging from 37 um to 43 um, and the dust-purifying layer has a thickness ranging from 37 um to 43 um.

4. A dust-purifying film comprising:
a dust-purifying adhesive layer, and
a protective layer,
the dust-purifying adhesive layer comprising:
a substrate layer,
an optically clear adhesive (OCA) layer, and
a dust-purifying layer adapted for dust-purifying and air bubbles elimination, the dust-purifying layer and the OCA layer respectively disposed on two sides of the substrate layer, wherein the protective layer is attached to the OCA layer,
the dust-purifying layer has fluidity, and
when the dust-purifying layer is arranged on a screen with foreign matters of an electronic device, the dust-purifying layer wraps the foreign matters on the screen and fills gaps formed between the foreign matters and the dust-purifying layer,
wherein a material of the dust-purifying layer comprises the following components mixed by weight ratio: 28%-35% methyl vinyl silicone rubber, 55%-65% ethyl formate, 8%-12% xylene and 1.5%-2.5% ethylbenzene.

5. The dust-purifying film according to claim 4, wherein the protective layer is a glass layer, and a thickness of the protective layer ranges from 0.05 mm to 0.85 mm.

6. The dust-purifying film according to claim 4, wherein the dust-purifying film further comprises a release layer, the release layer is arranged on a surface of the dust-purifying layer facing away from the substrate layer, and a thickness of the release layer ranges from 48 um to 52 um.

7. A dust-purifying film sleeve, comprising:
a dust-purifying film repair paper,
a protective layer, and
a dust-purifying adhesive layer, comprising
a substrate layer,
an optically clear adhesive (OCA) layer, and
a dust-purifying layer adapted for dust-purifying and air bubbles elimination, the dust-purifying layer and the OCA layer respectively disposed on two sides of the substrate layer
wherein the protective layer is attached to the OCA layer,
the dust-purifying film repair paper comprises a body and a repair layer arranged on the body, and configured to be arranged on the dust-purifying layer to repair the dust-purifying layer,
the dust-purifying layer has fluidity, and
when the dust-purifying layer is arranged on a screen with foreign matters of an electronic device, the dust-purifying layer wraps the foreign matters on the screen and fills gaps formed between the foreign matters and the dust-purifying layer,
wherein a material of the dust-purifying layer comprises the following components mixed by weight ratio: 28%-35% methyl vinyl silicone rubber, 55%-65% ethyl formate, 8%-12% xylene and 1.5%-2.5% ethylbenzene.

8. The dust-purifying film sleeve according to claim 7, wherein a viscosity of a composition which formed the repair layer is greater than a viscosity of a composition which formed the dust-purifying layer.

9. The dust-purifying film sleeve according to claim 7, wherein the repair layer is further configured to remove foreign matters on the dust-purifying layer by arranging the repair layer on the dust-purifying layer.

\* \* \* \* \*